United States Patent [19]

Prochazka et al.

[11] 4,374,792
[45] Feb. 22, 1983

[54] SINTERING OF SILICON NITRIDE WITH BE ADDITIVE

[75] Inventors: Svante Prochazka, Ballston Lake; Charles D. Greskovich, Schenectady, both of N.Y.

[73] Assignee: General Electric Company, Schenectady, N.Y.

[21] Appl. No.: 296,676

[22] Filed: Aug. 27, 1981

Related U.S. Application Data

[63] Continuation of Ser. No. 65,120, Aug. 9, 1979, abandoned.

[51] Int. Cl.$^3$ ............................................. C04B 35/58
[52] U.S. Cl. ...................................... 264/65; 264/332; 501/154
[58] Field of Search ......................... 264/65, 332, 325; 501/154

[56] References Cited

U.S. PATENT DOCUMENTS

4,119,689  10/1978  Prochazka ............................. 264/65
4,119,690  10/1978  Prochazka ............................. 264/65

Primary Examiner—John A. Parrish
Attorney, Agent, or Firm—Jane M. Binkowski; James C. Davis, Jr.

[57] ABSTRACT

A compact composed of a mixture of silicon nitride with less than about 0.5 weight % cation impurities and containing beryllium additive, and having an oxygen content of at least about 1.4 weight %, is sintered from 1900° C. to 2200° C. in nitrogen at superatmospheric pressure producing a sintered compact of at least about 80% density.

2 Claims, 1 Drawing Figure

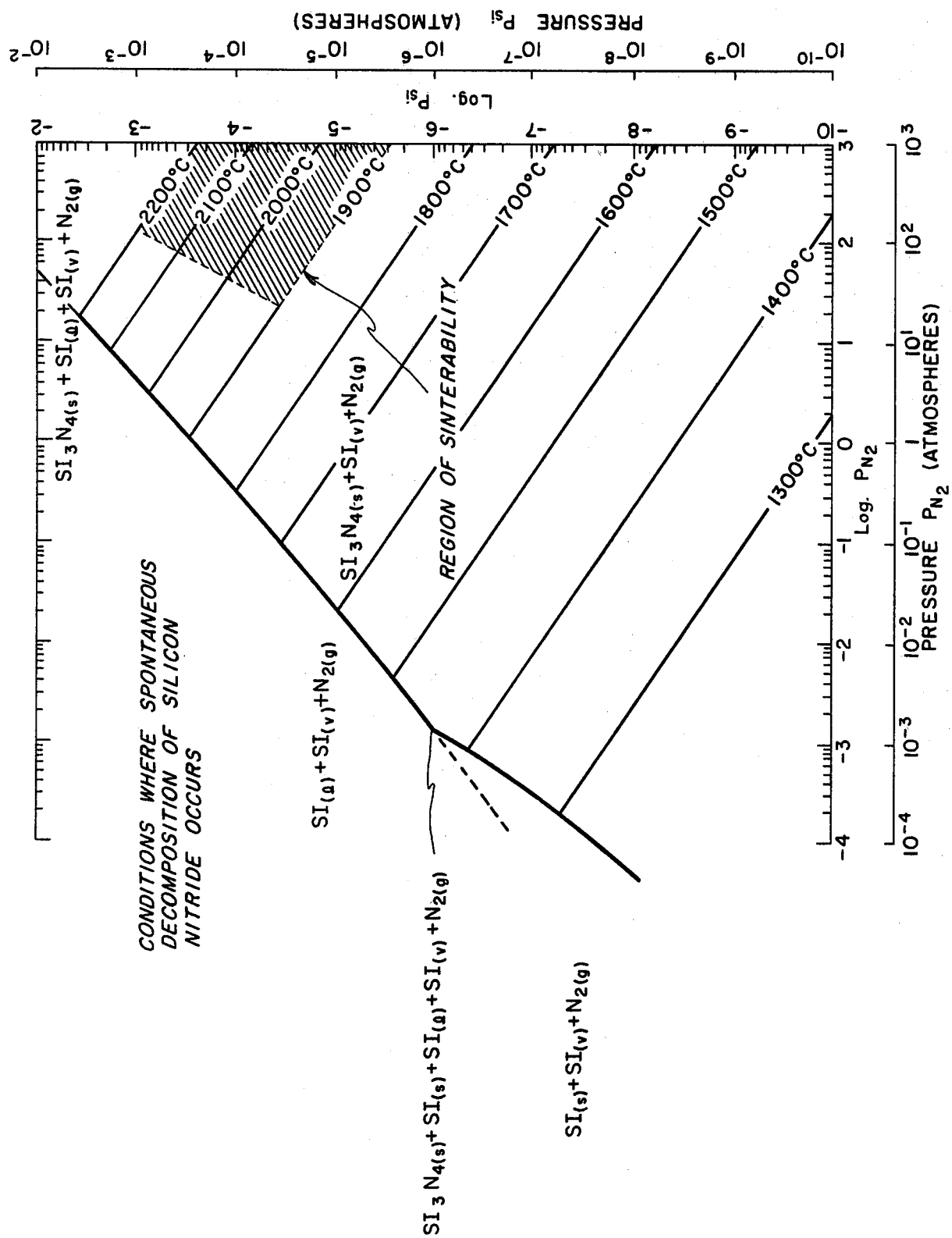

100
SINTERING OF SILICON NITRIDE WITH BE ADDITIVE

The invention described herein was made in the course of or under a contract or subcontract thereunder (or grant) with the Department of the Army.

This application is a continuation of application Ser. No. 065,120, filed Aug. 9, 1979, now abandoned.

The present invention relates to a method of producing a pre-shaped polycrystalline silicon nitride sintered body.

Silicon nitride, the stoichiometric formulation for which is $Si_3N_4$, is a refractory electrical insulator with high strength, hardness, high resistance to thermal shock and consequently, has many potential high temperature applications. The characteristics which make it unique among other materials is the low thermal expansion coefficient combined with its refractoriness and oxidation stability. Silicon nitride has long been a prime candidate material in the development of components for high temperature heat engines.

Silicon nitride parts are currently manufactured by either reaction bonding of silicon or hot-pressing. The first process has inherent limitations in achievable densities, and therefore strength, which exclude it from a number of typical applications. Consolidation by hot-pressing is achieved by using additions of oxides or nitrides of Mg, Be, Ca, Y, La, Ce, Zr to $Si_3N_4$ powders. The resulting ceramic is very strong but machining of complex components is very lengthy, difficult and frequently impossible or prohibitively expensive.

Sintering which would overcome the shaping problems has also been tried but with limited results since at temperatures approaching 1750° C. at atmospheric pressure silicon nitride decomposes rapidly. Silicon nitride with 90% density has been obtained by using an addition of 5% magnesia, by G. R. Terwilliger and F. F. Lange, "Pressureless Sintering of $Si_3N_4$", Journal of Materials Science 10(1975)1169, however, weight losses of up to 30% were observed and made the process impractical.

M. Mitomo, "Pressure Sintering of $Si_3N_4$", Journal of Materials Science 11(1976)1103–1107, discloses the sintering of $Si_3N_4$ with 5% MgO at 1450° to 1900° C. under a pressure of 10 atmospheres of nitrogen producing a maximum density of 95% of the theoretical value, that density and weight loss initially increased at the higher temperatures, that the density then decreased above a certain temperature because it was determined by two countervailing processes, shrinkage and thermal decomposition of silicon nitride and that his optimum temperature was ~1800° C.

It is known in the art that the high magnesium oxide additive necessary to induce sintering degrades oxidation resistance and high temperature mechanical properties of the silicon nitride product. The present invention does not use a magnesium oxide additive.

U.S. Pat. No. 4,119,689 to Prochazka et al., assigned to the assignee hereof and incorporated herein by reference, discloses the production of a sintered silicon nitride body by shaping a dispersion of silicon nitride and a beryllium additive into a green body and sintering it at about 1900° C. to about 2200° C. in nitrogen at a super-atmospheric pressure which at the sintering temperatures prevents significant thermal decomposition of said silicon nitride and produces a sintered body with a density ranging from about 80% to about 100% of the theoretical density of silicon nitride. U.S. Pat. No. 4,119,689 discloses that the minimum pressure of the nitrogen ranges from about 20 atmospheres at a sintering temperature of 1900° C. to a minimum pressure of about 130 atmospheres at a sintering temperature of 2200° C. and that pressures of nitrogen higher than the required minimum pressure at a particular sintering temperature are useful to additionally densify the body to produce a sintered body having a density higher than 80%. The patent further discloses that the preferred maximum pressure of nitrogen is one which produces a sintered body of the highest density at the particular sintering temperature and such preferred maximum nitrogen pressure is determinable empirically.

It has been found that when the level of metallic cation impurities, such as Ca, Al, Mg and Fe, in the $Si_3N_4$ powder is less than about 0.5 weight %, it is difficult to densify a compact of such silicon nitride and beryllium additive beyond 90% relative density, and as a practical matter, such a compact requires an oxygen content of at least about 1.4 weight % to densify beyond 90%.

Those skilled in the art will gain a further and better understanding of the present invention from the detailed description set forth below, considered in conjunction with the figure accompanying and forming a part of the specification which shows conditions where spontaneous decomposition of silicon nitride occurs, i.e. to the left of the heavy solid line, conditions where spontaneous decomposition of silicon nitride does not occur, i.e. to the right of the heavy solid line, and conditions necessary for producing the present sintered product, i.e. the shaded area referred to as the Region of Sinterability. Specifically, silicon nitride decomposes into silicon and nitrogen, and consequently, there is always a finite pressure of silicon vapor and nitrogen above a surface of silicon nitride. According to principles of chemical equilibrium, the higher the nitrogen pressure the lower the silicon vapor pressure and vice versa. The conditions shown to the right of the heavy solid line in the FIGURE are plots at a given temperature of the logarithm of the partial pressure of nitrogen and the logarithm of the corresponding partial pressure of silicon vapor. For convenience, a scale in atmospheres for the partial pressure of nitrogen as well as for the partial pressure of silicon vapor are given. At any conditions selected to the right of the heavy solid line in the FIGURE, spontaneous thermal decomposition of silicon nitride does not occur, but only the shaded area referred to as the Region of Sinterability sets forth temperature and corresponding pressure conditions which produce the present sintered product.

Briefly stated, the present method of producing a preshaped polycrystalline sintered silicon nitride compact comprises providing a silicon nitride powder containing less than about 0.5% by weight metallic cation impurities based on the total weight of said silicon nitride powder, providing at least a significantly homogeneous dispersion having an average particle size which is submicron of said silicon nitride powder and a beryllium additive, said beryllium additive being selected from the group consisting of beryllium, beryllium oxide, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a compact, said compact containing oxygen in an amount ranging from about 1.4% by weight to about 7% by weight of said silicon nitride, and sintering said compact at a temperature ranging from about 1900° C. to about 2200° C. in a sintering atmosphere of nitrogen, said nitrogen being at a superatmospheric pressure which at said sintering temperatures prevents significant thermal decomposition of said silicon nitride and produces a sintered compact with a density of at least about 80% of the theoretical density of silicon nitride, the minimum pressure of said nitrogen ranging from about 10 atmospheres at a sintering temperature of 1900° C. to a minimum pressure of about 65 atmospheres at a sintering temperature of 2200° C.

By a significant thermal decomposition of silicon nitride herein it is meant significant weight loss of silicon nitride due to thermal decomposition of silicon nitride and such significant weight loss of silicon nitride would be higher than about 3% by weight of the total amount of silicon nitride in the green body. Usually, however, in the present invention, weight loss of silicon nitride due to thermal decomposition of silicon nitride is less than 2% by weight of the total amount of silicon nitride in the green body.

The silicon nitride powder used in the present process can be amorphous or crystalline or mixtures thereof. The crystalline silicon nitride powder can be α- or β-silicon nitride or mixtures thereof.

The present silicon nitride powder may contain metallic and non-metallic impurities. Specifically, it contains less than about 0.5 weight %, and preferably less than about 0.1 weight %, of metallic cation impurities normally found in silicon nitride powder such as Ca, Al, Mg and Fe, based on the total composition of the starting silicon nitride powder. Also, its oxygen content may range up to about 7% by weight. A powder having an oxygen content in excess of about 7% by weight provides no advantage because it is likely to produce a sintered product with impaired high temperature mechanical properties. Normally the oxygen is present in the form of silica. The amount of excess elemental silicon which may be present in the powder is not critical, providing it is of submicron size, since during the sintering process elemental silicon is nitrided to form silicon nitride, and providing that the volume increase accompanying nitridation of the elemental silicon has no significant deleterious effect on the sintered product. Ordinarily, elemental silicon may be present in silicon nitride powder in amounts ranging up to about 4% by weight. Non-metallic impurities such as halogens which evaporate during sintering and which do not significantly deteriorate the properties of the sintered silicon nitride body may also be present frequently in amounts up to about 3% by weight of the starting silicon nitride powder.

In the present process the beryllium additive is selected from the group consisting of elemental beryllium, beryllium oxide, beryllium carbide, beryllium nitride, beryllium fluoride, beryllium silicon nitride and mixtures thereof. The known stoichiometric formulations for these additives are Be, BeO, $Be_2C$, $Be_3N_2$, $BeF_2$, and $BeSiN_2$, $Be_6Si_3N_8$, $Be_4SiN_4$, $Be_5Si_2N_6$, $Be_{11}Si_5N_{14}$, $Be_9Si_3N_{10}$. In the present process the beryllium additive is used in an amount so that its beryllium content is equivalent to from about 0.1% to about 2.0% by weight of elemental beryllium, and preferably from about 0.5% to about 1.0% by weight of elemental beryllium, based on the amount of silicon nitride.

In carrying out the process at least a significantly or substantially uniform or homogeneous particulate dispersion or mixture having an average particle size which is submicron of silicon nitride and beryllium additive is formed. Such a dispersion is necessary to produce a sintered product with significantly uniform properties and having the desired density. The silicon nitride and beryllium additive powders, themselves, may be of a particle size which breaks down to the desired size in forming the dispersion, but preferably the starting silicon nitride is submicron and the starting beryllium additive is less than 5 microns in particle size, and preferably submicron. Generally, the silicon nitride powder ranges in mean surface area from about 2 square meters per gram to about 50 square meters per gram which is equivalent to about 0.94 micron to 0.04 micron, respectively. Preferably, the silicon nitride powder ranges in mean surface area from about 5 square meters per gram to about 25 square meters per gram which is equivalent to about 0.38 micron to about 0.08 micron, respectively.

The silicon nitride and beryllium additive powders can be admixed by a number of techniques such as, for example, ball milling or jet milling, to produce a significant or substantially uniform or homogeneous dispersion or mixture. The more uniform the dispersion, the more uniform is the microstructure, and therefore, the properties of the resulting sintered body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing medium include hydrocarbons such as benzene and heptane. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained below the boiling point of the liquid mixing medium.

A number of techniques can be used to shape the powder mixture, i.e., particulate dispersion, into a compact. For example, the powder mixture can be extruded, injection molded, die-pressed, isostatically pressed or slip cast to produce the compact of desired shape. Any lubricants, binders or similar materials used in shaping the dispersion should have no significant deteriorating effect on the green body or the resulting sintered body. Such materials are preferably of the type which evaporate on heating at relatively low temperatures, preferably below 500° C., leaving no significant residue. The compact should have a density of at least about 35%, and preferably at least about 45% or higher, to promote sufficient densification during sintering and achieve attainment of the desired density.

In the present invention, the compact being sintered should contain oxygen in an amount ranging from at least about 1.4% by weight to about 7% by weight of the silicon nitride. Such oxygen content initially may be present in the silicon nitride powder, or it may be introduced into the powder, or into the homogeneous particulate dispersion of silicon nitride and beryllium additive, or into the compact formeed from such dispersion. To elevate the oxygen content to the desired amount, it is preferable to oxidize the homogeneous dispersion or compact. However, before the green compact can be oxidized, it must be fired, normally up to about 500° C. in air for about 1 hour, to remove any lubricants, binders or similar materials used in its shaping. Oxidation of the fired compact or homogeneous dispersion powder to a prescribed amount can be carried out, for example, by heating the weighed compact or powder in a temperature ranging from about 900° to about 1050° C. in an atmosphere of oxygen or air and monitoring increase in oxygen content by weight gain measurements. Alternatively, oxygen content of the treated compact or powder can be determined by neutron activation analysis.

The oxygen content in the compact being sintered ranges from about 1.4% by weight to about 7% by weight of the silicon nitride component. It is believed that the oxygen and beryllium form a liquid phase during sintering which promotes densification of the body. Therefore, the preferred amount of oxygen depends largely on the equivalent amount of beryllium present with which it can form a liquid phase, and it has been found that such preferred amount is at least about 2% by weight oxygen for an equivalent amount of beryllium less than 1% by weight, about 3.5% by weight oxygen for an equivalent amount of beryllium of about 1% by weight, and about 7% by weight oxygen for an equivalent amount of beryllium of about 2% by weight. An amount of oxygen in excess of about 7% by weight provides no significant advantage.

Should the oxygen content be too high, the powder or compact can be calcined to reduce its oxygen content at a temperature ranging from about 1400° C. to about 1500° C. in a vacuum or in an atmosphere which has no significant deteriorating effect on the powder such as helium, nitrogen, hydrogen and mixtures thereof.

In the present process, the sintering atmosphere of nitrogen can be stagnant or a flowing atmosphere and need only be sufficiently flowing to remove gaseous products which may be present, normally as a result of contaminants. Generally, the specific flow rate of nitrogen gas depends on factors such as the size of the furnace loading and sintering temperature.

Sintering of the compact is carried out at a temperature ranging from about 1900° C. to about 2200° C. in a sintering atmosphere of nitrogen at superatmospheric pressure which at the sintering temperature prevents thermal decomposition of the silicon nitride and also promotes shrinkage, i.e. densification, of the compact producing a sintered compact with a density of at least 80% of the theoretical density of silicon nitride. Sintering temperatures lower than about 1900° C. are not effective for producing the present sintered product whereas temperatures higher than 2200° C. would require nitrogen pressure too high to be practical. Preferably, the sintering temperature ranges from about 2050° C. to 2150° C.

The effect of increased nitrogen pressure on the sintering of silicon nitride can be best described by considering the effect of nitrogen pressure on the thermal decomposition

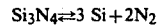

i.e. silicon nitride decomposes into silicon and nitrogen, and consequently there is always a finite pressure of silicon vapor and nitrogen above a surface of silicon nitride. According to principles of chemical equilibrium, the higher the nitrogen pressure the lower the silicon vapor pressure and vice versa. This may be expressed in quantitative terms by $$P_{Si}^3 \times P_{N_2}^2 = K_{(T)}$$

where $P_{Si}$ is partial pressure of silicon vapor, $P_{N_2}$ partial pressure of nitrogen and K is the equilibrium constant which is calculated from available published thermodynamical data and refers to a specific temperature. Specifically, the published thermodynamical data relied on herein is disclosed in Still et al, JANAF Thermochemical Tables, 2nd Ed., U.S. Dept. of Commerce, Nat. Stand. Ref. Data Ser.—Nat. Bur. Stand. (U.S.), 37, U.S. Government Printing Office, Washington, (June 1971). These thermodynamic relationships were calculated and are shown in the accompanying FIGURE where the logarithm of partial pressure of silicon vapor and partial pressure of nitrogen were plotted along with temperature scales and the coexisting phases shown.

From the FIGURE it can be seen that if nitrogen pressure above $Si_3N_4$ decreases at a given temperature, silicon vapor pressure increases until the saturated pressure of silicon vapor at the temperature applied is reached. At this and at lower nitrogen pressures silicon nitride will spontaneously decompose into silicon metal (liquid or solid) and nitrogen. In the FIGURE, the heavy solid line, from lower left to upper right delineates the set of conditions where silicon nitride, condensed silicon, silicon vapor and nitrogen gas coexist, i.e. conditions where spontaneous decomposition of silicon nitride occurs. Specifically, at any conditions selected to the left of the heavy solid line determined by nitrogen pressure and temperature, spontaneous decomposition of $Si_3N_4$ excludes sintering. At any conditions selected to the right of the heavy solid line, spontaneous thermal decomposition of silicon nitride does not occur. However, according to the present invention, only the shaded area in the FIGURE referred to s the Region of Sinterability sets forth temperature and corresponding pressure conditions which prevent thermal decomposition or significant thermal decomposition of the silicon nitride and also produce the present sintered product having a density of at least 80%. Specifically, the FIGURE illustrates that at every sintering temperature in the Region of Sinterability, a particular minimum pressure of nitrogen has to be applied and maintained which is substantially higher than the minimum pressure of nitrogen necessary to prevent spontaneous silicon nitride decomposition. The minimum sintering pressure of nitrogen is one which at a particular sintering temperature prevents thermal decomposition or significant thermal decomposition of the silicon nitride and also promotes densification, i.e. shrinkage, of the body to produce a sintered product with a density of at least 80%.

Generally, at a given sintering temperature in the Region of Sinterability, an increase in nitrogen pressure will shown an increase in the density of the sintered product, i.e., higher nitrogen pressures should produce higher density products. Likewise, at a given nitrogen pressure in the Region of Sinterability, the higher the sintering temperature, the higher should be the density of the resulting sintered product.

The shaded area referred to as the Region of Sinterability in the accompanying FIGURE shows that the particular minimum pressure of nitrogen used in the present process depends on sintering temperature and ranges from about 20 atmospheres at 1900° C. to about 130 atmospheres at a temperature of 2200° C. Specifically, the FIGURE shows that in accordance with the present process the minimum required pressure of nitrogen at 2000° C. is about 40 atmospheres, and at 2100° C. it is about 75 atmospheres. However, in the present process, when the compact is placed within a gas-permeable enclosure, such as, for example, a crucible covered with a screwed-down lid, the minimum required nitrogen pressure of the present invention decreases by about 50%. Therefore, in such instance, a minimum nitrogen pressure of about 10 atmospheres is required at 1900° C., a minimum nitrogen pressure of at least about 20 atmospheres is required at 2000° C., a minimum nitrogen pressure of about 37 atmospheres is required at 2100° C. and a minimum nitrogen pressure of about 65 atmospheres is required at 2200° C. Representative of materials useful for forming the present gas permeable enclosures are boron nitride, silicon nitride, aluminum nitride and silicon carbide.

In the present process pressures of nitrogen higher than the required minimum pressure at a particular sintering temperature are useful to additionally densify the body to produce a sintered body having a density higher than 80%. The preferred maximum pressure of nitrogen is one which produces a sintered body of the highest density at the particular sintering temperature and such preferred maximum nitrogen pressure is determinable empirically. Nitrogen pressures higher than the preferred maximum pressure are useful but such pressures cause no significant additional densification of the body.

The sintered product of the present invention is composed primarily, i.e. more than 99% by volume, of $\beta$-silicon nitride containing oxygen and beryllium in solid solution, with less than 1% by volume of the product being an amorphous glassy phase. The microstructure of the sintered product is characterized by elongated grains of $\beta$-silicon nitride ranging in size from about 1 micron to about 15 microns with an average grain size being typically about 3 microns to 5 microns. The residual pore phase is distributed between the silicon nitride grains and the amorphous or liquid phase is present primarily in pockets between the silicon nitride grains.

The present sintered product has a density of at least about 80% or higher of the theoretical density of silicon nitride. The higher the density of the sintered product, the better are its mechanical properties.

The present invention makes it possible to fabricate complex shaped polycrystalline silicon nitride ceramic articles directly. Specifically, the present sintered product can be produced in the form of a useful complex shaped article without machining such as an impervious crucible, a thin walled tube, a long rod, a spherical body, or a hollow shaped article. The dimensions of the present sintered product differ from those of its green body by the extent of shrinkage, i.e. densification, which occurs during sintering. Also, the surface quality of the sintered body depend on those of the green body from which it is formed, i.e. it has a substantially smooth surface if the green body from which it is formed has a smooth surface.

In the present invention, unless otherwise stated, the density of the sintered compact as well as that of the green body or unsintered compact is given as a fractional density of the theoretical density of silicon nitride (3.18/cc).

The invention is further illustrated by the following examples wherein the procedure was as follows unless otherwise stated:

Surface area measurements were made by a low temperature nitrogen absorption technique.

The metallic cation impurities present in the silicon nitride powder were composed primarily of a mixture of Al, Ca, Mg and Fe.

BeSiN$_2$ powder was used as the additive and it was admixed with the silicon nitride powder to produce a homogeneous particulate dispersion, i.e. mixture, having an average particle size which was submicron. Weight % BeSiN$_2$ is based on the total weight of the silicon nitride.

An electrically heated graphite pressure furnace was used.

Heating rates to sintering temperature ranged from about 5° C. to about 20° C. per minute.

At the end of each sintering run, the power was switched off and the sintered silicon nitride compact were furnace cooled to room temperature in the nitrogen atmosphere which was slowly depressurized to atmospheric pressure.

The bulk density of each unsintered compact was determined from its weight and dimensions.

Density of the sintered compact was determined by water displacement using Archimedes method.

Shrinkage given in Table I is linear shrinkage $\Delta L/L_o$ (%), and it is the difference in length between the green body and the sintered body, $\Delta L$, divided by the length of the green body $L_o$. This shrinkage is an indication of the extent of densification.

Commercial grade high purity bottled nitrogen gas was used.

Oxygen content is based on the total weight of silicon nitride and was determined by weight measurements and neutron activation analysis.

% Weight loss is the difference in weight between the unsintered and sintered compact divided by the weight of the unsintered compact.

EXAMPLE 1

A commerical Si$_3$N$_4$ powder containing about 0.01 weight % metallic cation impurities was milled and acid-leached. The resulting processed powder had less than 0.01 weight % metallic cation impurities, a specific surface area of 13 m$^2$/g and an oxygen content of 3.2 weight %.

BeSiN$_2$ powder was admixed with the processed silicon nitride powder in an amount of 7% by weight of the silicon nitride powder, which corresponds to 1.0% by weight of elemental beryllium, to produce a homogeneous particulate dispersion having an oxygen content of 3.2 weight %.

The dispersion was formed into a compact with a relative green density of almost about 50%.

The compact was inserted into a silicon carbide tube and covered with loose Si$_3$N$_4$ powder to protect the compact during firing. Specifically, the compact was placed in the silicon carbide sintering tube which was in turn placed within the furnace except for its open end which was fitted with a pressure head. The compact was placed so that it was positioned in the hot zone, i.e. the closed end portion of the sintering tube. The silicon carbide sintering tube was evacuated and then brought up to about 1000° C. At this point the pumping was discontinued and the sintering tube was pressurized to ~60 atmospheres of nitrogen. The sintering tube was then brought up to the sintering temperature of 2100° C. in about 20 minutes, and held at 2100° C. at ~60 atmospheres for 15 minutes. At the end of this time, it was furnace cooled to room temperature. The resulting sintered body had a density of 98%.

EXAMPLE 2

A commercial $Si_3N_4$ powder, composed of 65% $\alpha$-$Si_3N_4$ and 35% $\beta$-$Si_3N_4$, with a metallic cation impurity content of 0.1 weight %, a specific surface area of 13 $m^2/g$ and an oxygen content of 1.08 weight % was used in this Example. 7 weight % $BeSiN_2$ powder was admixed with the $Si_3N_4$ powder to produce a homogeneous particulate dispersion which was formed into a compact having a green density of about 53%.

The compact was sintered in the same manner as set forth in Example 1 except that the sintering temperature was 2080° C. The sintered compact had a density of 72%.

EXAMPLE 3

The procedure and materials used in preparing the green compact of this Example were the same as that set forth in Example 2.

The green compact had a density of about 53% and was fired in air at 900° C. for one hour and picked up 1.5 weight % oxygen resulting in a total content of oxygen of 2.58 weight %. This compact was then sintered in the same manner and under the same conditions disclosed in Example 2. The sintered compact had a density of 86%.

EXAMPLE 4

The procedure and materials used in preparing the green compact of this Example were the same as that set forth in Example 2 except that 1.5 weight % oxygen was added by means of $SiO_2$. Specifically, $SiO_2$ in an amount of 3% by weight of the silicon nitride powder was admixed therewith along with the $BeSiN_2$ powder to form a homogeneous dispersion containing a total of 2.58 weight % oxygen.

The dispersion was formed into a compact and sintered in the same manner and under the same conditions as set forth in Example 2. The sintered compact had a density of 92-93%.

EXAMPLE 5

A commercial $Si_3N_4$ powder was milled and acid leached to a specific surface area of about 13 $m^2/g$ and with metallic cation impurities less than 0.1 weight %. The powder had an oxygen content of 1.26 weight %.

$BeSiN_2$ powder was admixed with $Si_3N_4$ powder in an amount of 3.5% by weight of the $Si_3N_4$ powder, which corresponds to 0.5% by weight of elemental beryllium, to produce a homogeneous particulate dispersion having an oxygen content of 1.26 weight %. The dispersion was formed into a compact with a density of 60%.

The compact was sintered in the same manner as disclosed in Example 1 except that the sintering pressure was 54.5 atmospheres.

The resulting sintered compact had a density of 72% and is illustrated in Table I.

EXAMPLES 6 to 15

Examples 6 to 15 tabulated in Table I were carried out in the same manner as Example 5 except as shown in Table I.

Specifically, in Example 7 the compact was heated at 1500° C. in argon for 15 minutes and then cooled to room temperature before being placed in the silicon carbide sintering tube.

In Example 9, the green compact was prefired in air at 900° C. for one hour which increased its oxygen content to a total of 2.7 weight %.

In Example 10, the green compact was prefired in air at 900° C. for one hour which increased its oxygen content to a total of 2.7 weight %, and in addition, the loose $Si_3N_4$ powder used to cover the compact during sintering had also been prefired in air at 900° C. for one hour to increase its oxygen content.

In Examples 11 and 12, the $Si_3N_4$ powder was fired in air at 900° C. for one hour which increased the oxygen content to a total of 2.7 weight % before being admixed with the $BeSiN_2$ additive.

In Examples 13 and 14, the green compact was fired at 850° C. for one hour in air which increased the oxygen content of the Example 13 compact to a total of 2.7 weight % and that of Example 14 to a total of 2.3%.

In Example 15, the green compact was prefired in air at 850° C. for one hour which increased its oxygen content to 2.3%, and in addition, the $Si_3N_4$ powder used to protect the compact during sintering had also been prefired in air at 850° C. for one hour.

TABLE I

| Ex. No. | $BeSiN_2$ (wt. %) | Oxygen (wt. %) | Green Density (%) | Sintering Conditions T° C./$P_{N_2}$ (°C.) | (atm) | Sintered Product Density (%) | Weight Loss (%) | Comments |
| --- | --- | --- | --- | --- | --- | --- | --- | --- |
| 5 | 3.5 | 1.26 | 60 | 2100 | 54.5 | 72 | 0.7 | — |
| 6 | 3.5 | " | 60.5 | 2120 | 61.2 | 76 | 0.4 | — |
| 7 | 3.5 | " | 60.5 | 2100 | 61.2 | 75 | 0.5 | Compact heated in argon at 1500° C./15 min. |
| 8 | 3.5 | " | 58 | 2100 | 61.2 | 78 | −1.0 | — |
| 9 | 3.5 | 2.7 | 60 | 2100 | 54.5 | 89 | 2.0 | Compact exposed in air at 900° C./1 h. |
| 10 | 3.5 | " | 60 | 2100 | 54.5 | 92.5 | 2.0 | Compact exposed in air at 900° C./1 h. +Pack powder oxidized |
| 11 | 5.0 | " | 52 | 2100 | 54.5 | 87 | 6.8 | $Si_3N_4$ powder exposed at 900° C. in air |
| 12 | 5.0 | " | 53 | 2020 | 54.5 | 85 | 4.0 | " |
| 13 | 5.0 | " | 60 | 2100 | 54.5 | 91 | 1.4 | Compact exposed at 850° C. in air |
| 14 | 5.0 | 2.3 | 60 | 2100 | 54.5 | 91 | 1.5 | " |
| 15 | 5.0 | " | 60 | 2100 | 54.5 | 94.5 | 0.7 | Compact exposed at 850° C. in air +Pack powder oxidized |

In Table I, Examples 5 to 8 show that with 3.5 weight % $BeSiN_2$ and 1.26 weight % oxygen and under the given sintering conditions, the sintered product had relatively low densities.

Examples 9 to 15 illustrate the present invention. Specifically, Examples 9 and 10 show that with a slight increase in oxygen content and under the same sintering conditions as Example 5, sintered products with densities substantially higher than that of Example 5 were produced. Examples 11 to 15 show that by increasing the BeSiN$_2$ concentration to 5 weight % and providing an oxygen content of 2.3 weight % or 2.7 weight %, the resulting sintered compacts had high densities.

EXAMPLE 16

A silicon nitride powder having 0.4 weight % metallic cation impurities, a specific surface area of 13 m$^2$/g and containing 1.1 weight % oxygen was used. This powder was admixed with 3.5 weight % BeSiN$_2$ to produce a homogeneous particulate dispersion.

The dispersion was formed into a compact having a density of about 60%.

The compact was sintered in a boron nitride crucible which was then covered with a screwed-down lid of boron nitride forming a gas permeable enclosure. The crucible was then placed in the furnace which was evacuated to remove air and moisture therefrom, including the atmosphere within the boron nitride crucible, by pulling a vacuum on the furnace. The furnace was then maintained under the vacuum as it was heated to about 1000° C. Nitrogen pressure was then introduced into the furnace to 72 atmospheres, and then heating was continued to 2100° C. 72 atmospheres of N$_2$ was maintained during heating to 2100° C. by means of a pressure release valve. The compact was then sintered under 72 atmospheres N$_2$ at 2100° C. for 15 minutes. The sintered body had a density of 72%.

EXAMPLE 17

The procedure used in this Example was the same as that set forth in Example 16 except that the silicon nitride powder had 0.3 weight % metallic impurities, a specific surface area of 13.3 L m$^2$/g and contained 1.47 weight % oxygen. The green compact had a density of ∼60%. The resulting sintered product had a density of 92%.

EXAMPLE 18

The procedure used in this Example was the same as that set forth in Example 17 except that the silicon nitride powder contained 1.9 weight % oxygen. The green compact had a density of ∼60%. The resulting sintered product had a density of 92.3%.

In copending U.S. patent application Ser. No. 065,121 filed Aug. 9, 1979, now abandoned in favor of Ser. No. 301,707, filed Sept. 14, 1981, entitled "Sintering of Silicon Nitride to High Density" filed of even date herewith in the names of Charles David Greskovich, John Andrew Palm and Svante Prochazka and assigned to the assignee hereof, and which by reference is made part of the disclosure of this invention, there is disclosed forming a particulate dispersion of silicon nitride and beryllium additive into a compact, firstly sintering the compact from about 1900° C. to about 2200° C. in nitrogen at superatmospheric pressure sufficient to prevent thermal decomposition of the silicon nitride until the entire outside surface of the compact becomes impermeable to nitrogen gas, and then secondly sintering the compact from about 1800° C. to about 2200° C. under a nitrogen pressure having a value at least twice the first nitrogen sintering pressure to produce a compact with a density of 95% to 100%.

What is claimed is:

1. A method of producing a pre-shaped polycrystalline sintered body consisting of more than 99% by volume of β-silicon nitride containing oxygen and beryllium in solid solution with less than 1% by volume of said body being an amorphous glassy phase which consists essentially of providing a silicon nitride powder containing less than about 0.5% by weight metallic cation impurities based on the total weight of said silicon nitride powder, providing at least a significantly homogeneous dispersion having an average particle size which is submicron and which consists of said silicon nitride powder, oxygen and an additive consisting of a beryllium additive, said beryllium additive being selected from the group consisting of beryllium, beryllium oxide, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a compact, said compact containing oxygen in an amount ranging from about 1.4% by weight to about 7% by weight of said silicon nitride, said compact containing increasing amounts of said oxygen with increasing amounts of said beryllium component, said compact containing about 7% by weight oxygen for an equivalent amount of said elemental beryllium of about 2% by weight, and sintering said compact at a temperature ranging from about 1900° C. to about 2200° C. in a sintering atmosphere of nitrogen, said nitrogen being at a superatmospheric pressure which at said sintering temperatures prevents significant thermal decomposition of said silicon nitride and produces a sintered body with a density of at least about 80% of the theoretical density of silicon nitride, the minimum pressure of said nitrogen ranging from about 10 atmospheres at a sintering temperature of about 1900° C. up to a pressure of about 65 atmospheres at a sintering temperature of about 2200° C. said compact being sintered within a gas permeable enclosure.

2. A method of producing a preshaped polycrystalline sintered body consisting of more than 99% by volume of β-silicon nitride containing oxygen and beryllium in solid solution with less than 1% by volume of said body being an amorphous glassy phase which consists essentially of providing a silicon nitride powder containing less than about 0.5% by weight metallic cation impurities based on the total weight of said silicon nitride powder, providing at least a significantly homogeneous dispersion having an average particle size which is submicron and which consists of said silicon nitride powder, oxygen and an additive consisting of a beryllium additive, said beryllium additive being selected from the group consisting of beryllium, beryllium oxide, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a compact, said compact containing oxygen in an amount ranging from about 1.4% by weight to about 7% by weight of said silicon nitride, said compact containing increasing amounts of said oxygen with increasing amounts of said beryllium component, said compact containing about 7% by weight oxygen for an equivalent amount of said elemental beryllium of about 2% by weight, and sintering said compact at a temperature ranging from about 2050° C. to about 2200° C. in a sintering atmosphere of nitrogen, said nitrogen being at a superatmospheric pressure which at said sintering temperatures prevents significant thermal decomposition of said silicon nitride and produces a sintered body with a density of higher than about 90% of the theoretical density of silicon nitride, the pressure of said nitrogen being about 30 atmospheres at a sintering temperature of about 2050° C. up to a pressure of about 65 atmospheres at a sintering temperature of about 2200° C. said compact being sintered within a gas permeable enclosure.

* * * * *